United States Patent [19]

Abelson et al.

[11] 4,042,559
[45] Aug. 16, 1977

[54] ABRASION RESISTANT COATED ABRASIVE PIPE LINING SHEET

[75] Inventors: Paul N. Abelson, Lewiston; Halsey W. Buell, Niagara Falls; William E. Hallatt, Lewiston, all of N.Y.

[73] Assignee: The Carborundum Company, Niagara Falls, N.Y.

[21] Appl. No.: 527,986

[22] Filed: Nov. 29, 1974

Related U.S. Application Data

[63] Continuation of Ser. No. 237,314, March 23, 1972, abandoned.

[51] Int. Cl.$^2$ .................... C08K 3/14; C08K 3/22; C08K 3/28; C08K 3/38
[52] U.S. Cl. .................... 260/38; 260/37 EP; 260/37 N; 260/42.37; 51/298 A; 428/143; 428/220; 428/242
[58] Field of Search .................... 51/298; 428/36, 143, 428/220, 223, 242, 343, 342; 260/38, 42.37, 37 N, 37 EP

[56] References Cited

U.S. PATENT DOCUMENTS

| 3,295,940 | 1/1967 | Genou | 51/298 |
|---|---|---|---|
| 3,306,718 | 2/1967 | Chapin | 51/298 |
| 3,360,391 | 12/1967 | Richtzenhain | 260/37 EP |
| 3,498,827 | 3/1970 | Vanderbilt et al. | 428/36 |
| 3,787,273 | 1/1974 | Okrepkie et al. | 51/298 |
| 3,836,420 | 9/1974 | Freese | 428/143 |
| 3,846,161 | 11/1974 | Marks | 260/38 |
| 3,864,101 | 2/1975 | Charvat | 51/291 |
| 3,876,579 | 4/1975 | Hallstrom et al. | 51/298 |

OTHER PUBLICATIONS

Kirk–Othmer, *Encyclopedia of Chemical Technology*, vol. 1, 2nd ed. © 1963, pp. 27–31.

*Primary Examiner*—Sandra M. Person
*Attorney, Agent, or Firm*—David E. Dougherty; Robert C. Weber

[57] ABSTRACT

A composite abrasion resistant, coated and abrasive containing pipe lining sheet comprises a pipe lining layer consisting from about 30 to about 70% by volume of abrasion resistant abrasive granules (preferably from about 45 to about 55% by volume of silicon carbide, alumina or alumina/zirconia granules of blocky shape, nonaligned orientation and diverse size) and from about 70 to about 30% by volume (preferably from about 55 to about 45% by volume) of a flexible organic resin binder, preferably phenolic, polyurethane, polybutadiene-acrylonitrile or epoxy resins. The pipe lining sheet can optionally be provided with a paper or textile backing bonded thereto, or with a backing of nonabsorbent, nonreactive film such as polyester, which can later be stripped off the abrasion resistant pipe lining material prior to use for lining pipes. The composite abrasion resistant pipe lining sheet can be bonded to the inner perimeter of the outer portion of a pipe by mechanical means, chemical means or a combination thereof. The abrasion resistant pipe lining sheet can be used as the innermost component for building a pipe; or it can be applied to the inside of a pre-existing pipe by adhesive means or, in the case of a metallic pipe and a composite abrasion resistant pipe lining sheet having a metallic flexible binder, by welding or brazing to the inner perimeter of the pre-existing metallic pipe.

12 Claims, 8 Drawing Figures

ABRASION RESISTANT COATED ABRASIVE PIPE LINING SHEET

This is a continuation, of copending application Ser. No. 237,314, filed Mar. 23, 1972, now abandoned.

BACKGROUND OF THE INVENTION

This invention relates to an abrasion resistant, coated and abrasive containing, pipe lining sheet.

Whenever it is desired to move large quantities of liquid material from one fixed location to another fixed location, one of the most economical methods of carrying out such transport is to provide a pipe system from one loction to the other. So economical is this method, that in many cases it is even preferred for transporting solid particles in a liquid suspension, i.e., a slurry. For example, in many mining operations it is proving desirable to use pipe systems to transport not only fresh water and acid mine water, but also slurries containing particles of iron ore or other mined material from the mine to the refinery where the ore is processed.

Materials which have been used for transporting such slurries in the past include steel or wooden pipe, both of which are destroyed relatively soon by the abrasive nature of the slurries (hereinafter "abrasive slurries") transported. Stainless steel pipe is a partial answer to this problem, but it is expensive and is also eventually destroyed. One system of transporting slurries involves the use of cast iron pipe, which is rotated 90°0 on its axis every six months or so, so that a new surface is exposed by gravity to the force of the particles contained in the slurry. Cast iron pipe is heavy, so cast iron pipe rotation is tedious. After four 90° rotations, too, the entire inner perimeter of the pipe has been worn by the abrasive slurries, and the pipe must eventually be replaced. Liners of polyurethane or various types of rubber, of varying thicknesses, have been proposed, but these liners wear away all too quickly. Furthermore, the installation and repeated reinstallation of cast iron is expensive, usually requiring the use of capital equipment, because of the great weight of the pipe.

Another approach to the problem of transporting abrasive slurries is the use of nonreinforced thermoplastic pipe. Nonreinforced thermoplastic pipe is corrosion resistant, but it has a low burst strength, and accordingly cannot be used to transmit liquids under high pressure; and it also wears out quite quickly. Aluminum pipe has a higher burst strength and lower wear rate than nonreinforced thermoplastic pipe, but these properties for aluminum pipe are still relatively unsatisfactory.

To overcome the disadvantages of these types of pipe, it has recently been proposed to use filament wound reinforced plastic pipe (see *Coal Mining and Processing,* Vol. 8, No. 5, pages 45 and 57-59, May 1971). An example of such pipe is the glass fiber reinforced epoxy pipe made by Fiberglass Resources Corporation of Farmingdale, New York. Even glass fiber reinforced epoxy pipe, however, eventually wears out when used to transport abrasive slurries, when the pipe is not provided with an abrasion resistant lining material.

Accordingly, it is an object of the present invention to provide an abrasion resistant, coated and abrasive containing pipe lining sheet, which can be used to build a superior pipe for transmitting abrasive slurries, or to line a pre-existing pipe to impart additional abrasion resistance thereto.

SUMMARY OF THE INVENTION

According to one aspect of the present invention, there is provided a composite, abrasion resistant, coated and abrasive containing pipe lining sheet having a thickness of not less than about 0.75 mm, a backing side with a relatively smooth surface and an opposite abrasive containing side with a relatively uneven surface, and being sufficiently flexible to be wound, backing side inward, around a mandrel in building a pipe or within a pre-existing pipe. The sheet also includes a backing, and an abrasion resistant, composite pipe lining layer on the backing and consisting essentially of (1) from about 30 to about 70% by volume of abrasion resistant abrasive granules selected from the group consisting of the refractory metal borides, carbides, nitrides, oxides, and mixtures thereof and from about 70 to about 30% by volumes of a flexible, at least partially cured organic resin binder. Such composite layer is formed by a first binder coat on the backing and forming such smooth surface, a coating of the abrasive granules deposited on such first binder coat in a non-aligned oriention and compacted in said first binder coat under pressure, and a second binder coat covering the granules, merging with the first binder coat and forming such rough surface. Preferably, the abrasion resistant granules have (1) a minimum particle size (mesh size through which all the particles will pass) of at least about 50 microns, with most of the granules being somewhat larger; (2) a blocky shape (defined as having a maximum dimension of not more than twice the minimum dimension of the granules and somewhat smaller than the thickness of the sheet), as opposed to the elongated granule shape which is characteristic of many coated abrasives; (3) a non-aligned orientation, as opposed to the aligned orientation which is characteristically obtained by electrostatic coating techniques and (4) such diverse size that all of the largest 50% by weight of the granules have at least 30% greater maximum dimension than all of the smallest 10% by weight of such granules.

According to another aspect of the invention, there is provided a method of making such an abrasion resistant pipe lining, sheet, coated and abrasive containing, comprising the steps of applying a first binder coat of an uncured organic resin binder selected from the group consisting of phenolic resins, polyurethane resins, polybutadiene-acrylonitrile resins and epoxy resins, to a backing material of paper, textile or combinations thereof; applying a coating of abrasion resistant granules to produce a granule—coated article; rolling the granule—coated article under a pressure of from about 250 to about 850 gms/cm$^2$, preferably about 280 to about 350 gms/cm$^2$, to compact the abrasion resistant granules; applying to the rolled, granule—coated article, over the first binder coat and compacted granules, a second binder coat of an uncured resin binder selected from the group consisting of phenolic resins, polyurethane resins, polybutadiene-acrylonitrile resins and epoxy resins; and at least partially curing the first and second binder coats. Preferably, the coating of abrasion resistant granules is applied or deposited by gravity feed (e.g., sprinkling the granules) to produce a nonaligned orientation, at a rate sufficient to provide from about 30 to about 70% by volume of the cured abrasions resistant pipe lining layer.

According to another aspect of the present invention, there is provided a second method of making such an abrasion resistant, coated and abrasive containing pipe lining sheet, in which instead of a paper or textile backing, a backing of nonabsorbent, nonreactive film material is used and subsequently removed from the composite pipe lining layer.

According to yet another aspect of the invention, there is provided a composite abrasion resistant, coated and abrasive containing pipe lining sheet in a pipe, bonded to the inner perimeter of the outer portion of the pipe by mechanical means, chemical means, or a combination thereof.

DETAILED DESCRIPTION

Figure 1:
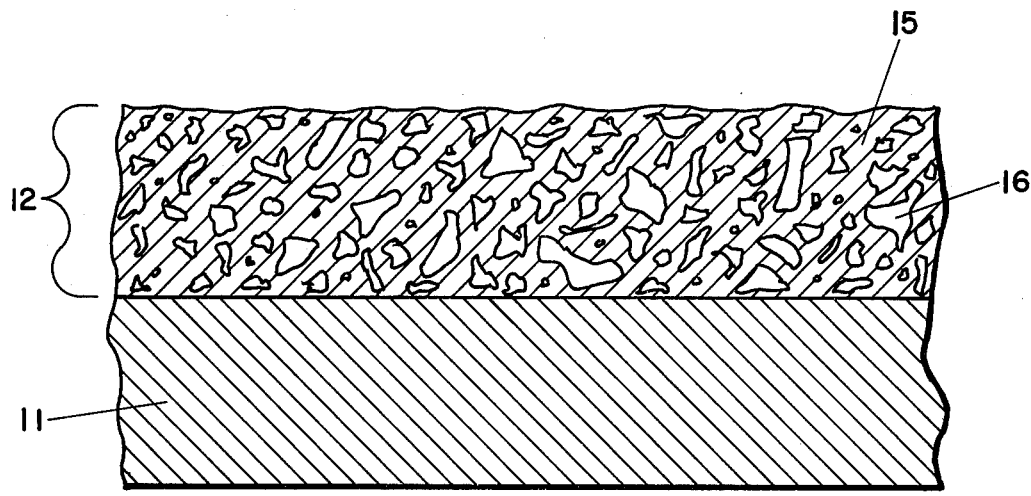
FIG. 1 is a sectional view of one embodiment of the present invention, comprising an abrasion resistant composite pipe lining layer consisting essentially of abrasion resistant abrasive granules and a flexible binder, and as a second layer, a backing material.

According to the present invention there is provided a composite, abrasion resistant, coated and abrasive containing, pipe lining material, comprising from a composite lining consisting essentially of about 30 to about 70% by volume of abrasion resistant granules (more preferably from about 45 to about 55% by volume) and from about 70 to about 30% by volume of a flexible organic resin binder (more preferably from about 55 to about 45% by volume).

It is usually preferred, even though the pipe lining sheet as finally constituted may comprise a layer containing only these two components, that a backing (forming a second layer of the pipe lining material) be used in initially forming the abrasion resistant pipe lining sheet. Depending on the use to which this backing is to be put, the backing material can be widely varied. For example, if the backing is intended to be utilized only as an aid in manufacturing the abrasion resistant pipe lining material, then it has been found highly useful to use a nonabsorbent, nonreactive film as the backing material. An example of such a backing material is polyester film, i.e., poly(alkylene terephthalate), e.g., Mylar polyethylene terephthalate polyester. It has been found that a nonabsorbent, nonreactive film such as polyester film can be removed easily from the layer of abrasion resistant granules and flexible binder, leaving only an abrasion resistant pipe lining layer consisting essentially of these two essential components. Other nonabsorbent, nonreactive films can be used, but polyester is preferred for its strength. The film can be formed into an endless belt, and used repeatedly to form abrasion resistant pipe lining sheet; or the film can merely be stripped or otherwise removed from the abrasion resistant pipe lining layer and stored for reuse.

If it is not desired to use a nonabsorbent, nonreactive film as the backing material, it has been found highly desirable to use a backing of paper, textile (such as cloth or nonwoven textile), or combinations thereof. Because these materials are absorbent, they exhibit bonding action with the binder which bonds together the abrasion resistant granules. If ordinary untreated paper or cloth is utilized as the backing material, it will usually quickly wear away when the pipe is ultimately used to transport abrasive slurries, since the preferred method of building a pipe with the abrasion resistant pipe lining sheet of the present invention contemplates that the backing side of the pipe lining material will be in the innermost portion of the pipe (see FIG. 4). The backing layer will therefore be directly subjected to the abrasive action of the abrasive slurry which is transported in the pipe. If it is desired to allow this wearing away to occur, then ordinary untreated paper or cloth, such as might be utilized in the coated abrasive art to form an ordinary piece of sandpaper or other coated abrasive article, can be utilized. In fact, such backings are highly preferred for some applications because of their low cost and the lack of special treatment steps which are necessary for their use. If the worn away paper or textile backing will interfere with the material to be transported in the pipe, it can be worn away prior to using the pipe.

If, on the other hand, it is desired to use the backing material as an additional aid in abrasion resistance, a paper or fabric backing which has been impregnated with a filler material, prior to forming the abrasion resistant pipe lining sheet, has proved highly useful. Such filler materials include, for example, polyurethane or nitrile rubber. Polyurethane is the reaction product of a polyisocyanate, i.e., a compound containing at least 2 isocyanate groups, with a compound having at least 2 active hydrogen atoms (e.g., polyethers), such as phenylene diisocyanate and polytetramethylene ether glycol, respectively. Polybutadiene-acrylonitrile, or nitrile rubber is a copolymer of butadiene and acrylonitrile; it is also known as buna-N, and typically contains from about 55 to about 67% by weight butadiene, and from about 33 to about 45% by weight acrylonitrile.

The abrasion resistant granules for use in the abrasion resistant pipe lining sheet of the present invention are preferably selected from the refractory metal borides, carbides, nitrides, oxides, and mixtures. For example, suitable materials include borides of aluminum, niobium, silicon, tantalum, titanium, tungsten and zirconium; carbides of boron, niobium, silicon, tantalum, titanium, tungsten and zirconium; nitrides of aluminum, boron, niobium, silicon, tantalum, titanium, tungsten and zirconium; and oxides of aluminum, niobium, silicon, tantalum, titanium, tungsten and zirconium. Other materials which can be utilized include the abrasion resistant minerals, such as granite.

The preferred abrasion resistant granules for use in the abrasion resistant pipe lining sheet of the present invention, however, are those materials which are in common use as abrasives, for example silicon carbide, alumina, and fused combinations of alumina and zirconia. Mixtures of these may also be used. Combinations of alumina and zirconia which can be used in the present invention include fused combination comprising from about 10 to about 60% zirconia and from about 40 to about 90% alumina, with about 20 to about 30% zirconia and from about 70 to about 80% alumina being preferred. Other materials can, of course, be present in the fused combinations of alumina and zirconia, such as silica, titania, iron oxide, magnesia, sodium oxide and carbon, these materials being commonly present in trace amounts (about 1% or less) in commercially available fused mixtures of alumina and zirconia. An excellent example of fused alumina/zirconia which has proved highly useful in the abrasion resistant pipe lining material of the present invention is R-51 grain which is produced by The Carborundum Company of Niagara Falls, New York.

The size of the abrasive resistant granules which are used in the abrasion resistant pipe lining sheet of the present invention will depend upon the thickness of the abrasion resistant pipe lining material, which in turn will depend in part on the diameter of pipe which is intended to be made abrasion resistant. In general, it can be stated that the abrasion resistant pipe lining sheet of the present invention can be made as thick as desired, so long as the thickness of the abrasion resistant pipe lining material does not interfere with the desired degree of flexibility. For example, an abrasion resistant pipe lining material made with a cured, cracked phenolic resin binder (cracks having been induced in the cured phenolic resin binder in order to render the pipe lining sheet flexible) is adequately flexible for lining pipes of diameters over about 5 cm; while a 0.75 mm thick polyurethane bonded abrasion resistant pipe lining sheet is sufficiently flexible that pipes as small as 5 mm diameter or smaller could be produced, if desired. For very large pipes, having inside diameters of 1 meter or more, the abrasion resistant pipe lining sheet might be 2 or 3 cm or more in thickness.

The abrasion resistant granules which are utilized in the abrasion resistant pipe lining sheet should then be somewhat smaller than the thickness of the abrasion resistant pipe lining sheet, in order to not interfere with its flexibility. In general, it is preferred that the abrasion resistant granules have a maximum dimension no more than about ½ the thickness of the abrasion resistant pipe lining sheet, although this is not a strict limit. Within this limitation, however, and subject to the preference for diverse sizes as described below, it is generally preferred to use larger abrasion resistant granules. A minimum particle size (mesh size through which all the particles will pass) of at least 50 microns, with most of the granules being somewhat larger, is preferred.

More important than the actual size of the abrasion resistant granules is the preference that of whatever size the particles be, a mixture of particles of different size should be utilized. This results in a higher density (percentage by volume) of abrasion resistant granules in the abrasion resistant pipe lining material, which in turn produces a higher degree of abrasion resistance. For some applications, where a high density of granules is important, it is preferred that the abrasion resistant granules be of such diverse size that all of the largest 50% by weight of the granules are at least 30% larger (i.e., have at least 30% greater maximum dimension) than all of the smallest 10% by weight of the abrasion resistant granules. An even more preferable condition is that the abrasion resistant granules be of such diverse size that all of the largest 85% by weight of the granules are at least 50% larger than all of the smallest 10% by weight of the abrasion resistant granules. For other applications where the nature of the abrasive slurry indicates small particles would be worn away and high granule density is not as important, a more uniform grain size can be used.

The binders used to bond together the abrasion resistant granules into an abrasion resistant pipe lining sheet are in general preferred to be metallic, phenolic, polyurethane, polybutadiene-acrylonitrile or epoxy binders. Metallic flexible binders are used when it is desired to weld or braze the abrasion resistant pipe lining material to the inner surface of a pre-existing metallic pipe. The metallic bonded pipe lining sheets are produced by conventional means such as rolling or extrusion of the metallic bonding material and the abrasion resistant particles, and no backing is generally utilized. Flexibility is obtained by the thinness of the pipe lining material. An example of a metallic binder is phosphor bronze.

For most applications, however, the use of an organic resin binder is highly preferred. Those binders which are particularly preferred are phenolic, polyurethane, polybutadiene-acrylonitrile and epoxy resin binders. Phenolic (phenol-aldehyde) resins are condensation products of an aldehyde, such as formaldehyde, and a phenolic compound, such as phenol or resorcinol. Polyurethane and polybutadiene-acrylonitrile resins have been discussed above. Epoxy resins are thermosetting resins in which one reactant is an epoxy compound, e.g., the reaction product of epichlorohydrin and bisphenol A. In specifying the resin binders as phenolic, polyurethane, polybutadiene-acrylontrile or epoxy, these terms include such binders containing conventional filler materials for such binders, sometimes in substantial amounts. In particular, one binder system which has proved highly effective is a phenolic resin binder containing from about 60 to about 70% by dry weight of finely divided calcium carbonate.

The polyurethane and polybutadiene-acrylonitrile resin binders should preferably be fully cured prior to their use in building a pipe, since they are unmangagable prior to being fully cured, and their flexibility is not adversely affected by curing. The phenolic or epoxy binders, however, can either be cured to the point of inflexibility and subsequently rendered again flexible by mechanically inducing cracks in the cured binder, such as is conventional in the coated abrasive art, or the phenolic or epoxy resins can be advanced only partially in their polymerization, to a state where a degree of flexibility is still present, for example to the "B-stage" of polymerization. The use of phenolic or epoxy resin binders which have been cured only partially, prior to building an abrasion resistant pipe, has the advantages that (1) the partially cured resin is sufficiently stable to be moved and even shipped from one location where the pipe lining material is made to another location where the pipe is built, and (2) when the binder in the outer portion of the pipe is cured, the curing of the pipe lining biner can be simultaneously completed, thereby producing a stronger bond between the pipe lining material and the outer portion of the pipe. As used herein, the term "outer portion" of a pipe means all of the pipe except the pipe lining sheet.

Turning now to the drawings, FIG. 1 illustrates a preferred embodiment of the present invention, comprising a paper or cloth backing layer 11 and an abrasion resistant, composite pipe lining layer 12. Layer 12 consists essentially of from about 45 to about 55% by volume of flexible binder 15 and from about 55 to about 45% by volume abrasion resistant granules 16.

Figure 2:
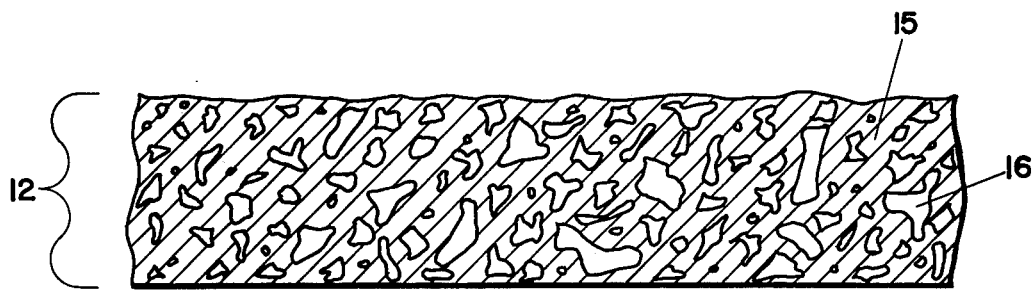
FIG. 2 is a sectional view of a second embodiment of the abrasion resistant pipe lining sheet of the present invention, without a backing material layer.

FIG. 2 is similar to FIG. 1, except that a nonabsorbent, nonreactive film such as polyester film backing has been used, and after the pipe lining sheet has been formed the film has been removed from layer 12 of abrasion resistant granules 16 and flexible binder 15.

Figure 3:
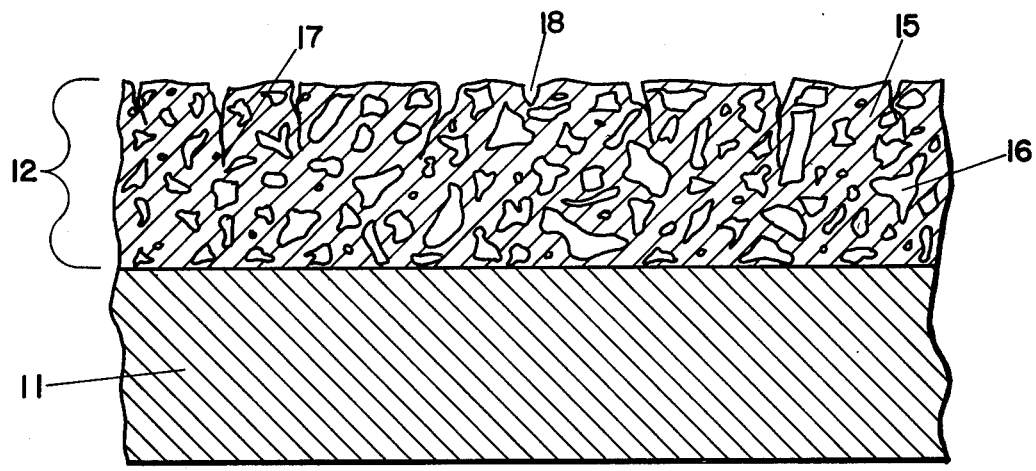
FIG. 3 is a sectional view of the abrasion resistant pipe lining sheet of FIG. 1, illustrating a preferred embodiment of the invention wherein the pipe lining material has been rendered flexible by mechanically inducing cracks in the cured binder.

FIG. 3 illustrates the abrasion resistant pipe lining material of FIG. 1 at a later stage of processing. Specifically, a phenolic or epoxy resin can be used as the binder for the abrasion resistant granules, and the binder can be cured to the point of inflexibility prior to using the abrasion resistant pipe lining sheet for building abrasion resistant pipes. This may, for example, be necessary if the pipe lining sheet is to be stored for any length of time, since the polymerization of the binder will proceed to the C-stage of its own accord, without additional induced curing, given sufficient time. It is therefore necessary to render binder 15 again flexible, by inducing appropriate cracks 17 in the abrasion resistant pipe lining material. This can be done, for example, by flexing the cured phenolic or epoxy resin bonded abrasion resistant granules by passing the pipe lining sheet over one or more rollers or flexing bars, such as is conventional in the coated abrasive art. While for the most part, cracks 17 will not be of substantial lateral size, they will produce at the relatively uneven surface of the side of layer 12 opposite the relatively smooth surface of the side adjacent backing 11 a number of spaces 18, paticularly when the abrasion resistant pipe lining sheet is wrapped or wound around a mandrel, backing side inward preliminary to building a pipe with the abrasion resistant pipe lining sheet.

Figure 4:
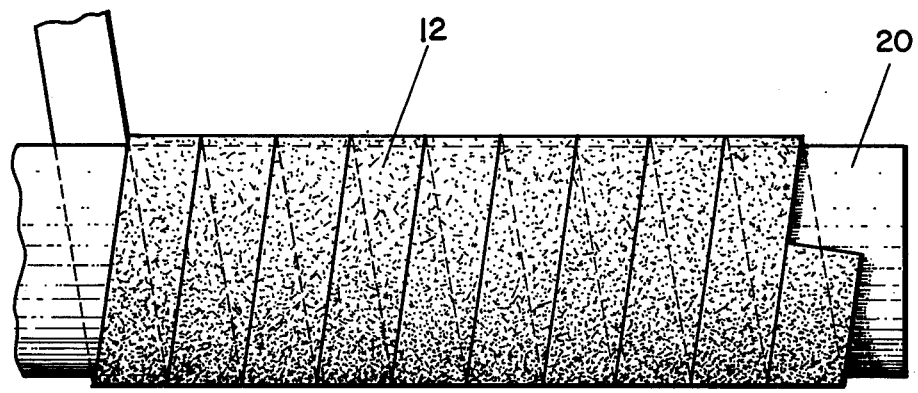
FIG. 4 illustrates one preferred method of how to use the abrasion resistant pipe lining sheet of the present invention, by wrapping or winding the pipe lining sheet helically about a cylindrical mandrel with the backing side of the pipe lining material adjacent to the mandrel, as the first step of building an abrasion resistant pipe.

FIG. 4 illustrates such a wrapping or winding operation, wherein the composite abrasion resistant pipe lining layer 12, with or without an underlying paper or cloth backing (not shown in FIG. 4) is wrapped helically about a cylindrical mandrel 20, with the backing side of the pipe lining sheet (if present) adjacent to the mandrel. The reinforcing material for the pipe, for example, glass fibers, together with the outer binder material which is used to hold together the reinforcing material for the pipe, are then wrapped around mandrel 20, over the abrasion resistant pipe lining layer 12. The outer binder material for the pipe is then cured. The outer binder material can be any desired curable binder, and phenolic resins, polyurethane resins and epoxy resins are desirable binders for this purpose. Epoxy resins are particularly preferred.

If the resin binder of abrasion resistant pipe lining layer 12 has not been fully cured, the curing of this inner resin binder can be completed simultaneously with curing the outer resin binder of the pipe, thereby producing a strong bond between the inner resin binder of the abrasion resistant pipe lining layer 12 and the outer resin binder of the outer portion of the pipe.

If the nature of the respective binders utilized in the abrasion resistant pipe lining layer 12 and in the outer portion of the pipe are such that they are chemically reactive, such as when polyurethane and epoxy resin binders are used, a chemical bond is obtained between the abrasion resistant pipe lining layer 12 and the outer portion of the pipe. Furthermore, if the pipe lining layer 12 has been flexed to induce small mechanical cracks 17 of the pipe lining material, as illustrated in FIG. 3, portions of the uncured binder of the outer portion of the pipe can impregnate these cracks and thereby produce a strong mechanical bond between the pipe lining layer and the outer portion of the pipe when the binder of the outer portion of the pipe is cured.

Figure 5:
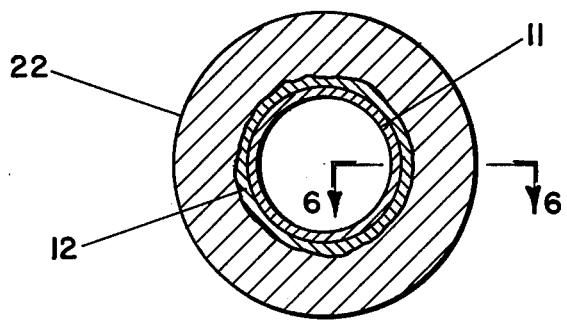
FIG. 5 is an end view of an abrasion resistant pipe built from the abrasion resistant pipe lining sheet of the present invention.

The complete pipe, after having been cured and removed from the mandrel, is illustrated in an end view in FIG. 5. Paper or cloth backing 11 (if used), abrasion resistant pipe lining layer 12, and outer reinforced layer 22 form successively larger concentric annular layers which constitute the abrasion resistant pipe.

Figure 6:
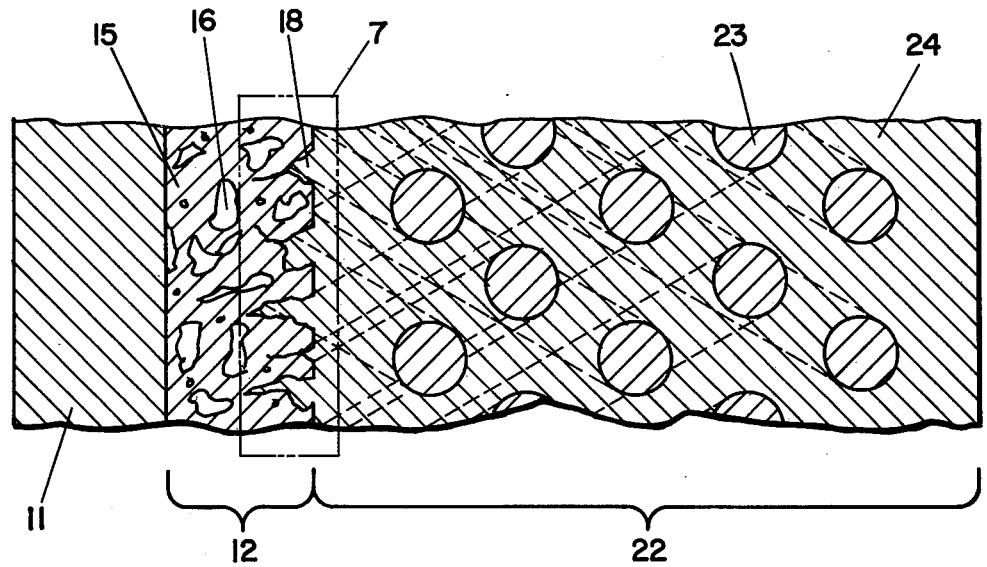
FIG. 6 is a sectional view, greatly expanded, of a portion of the pipe illustrated in FIG. 5, taken along line 6—6 of FIG. 5.

An expanded sectional view of FIG. 5, taken along line 6—6 of FIG. 5, is shown in FIG. 6. In addition to the elements illustrated in previous figures, FIG. 6 illustrates the reinforcing material 23 within outer reinforced layer 22 of the abrasion resistant pipe. Reinforcing material 23 can be, for example, layers of successively helically would glass fiber, contained within an epoxy resin matrix 24.

Figure 7:
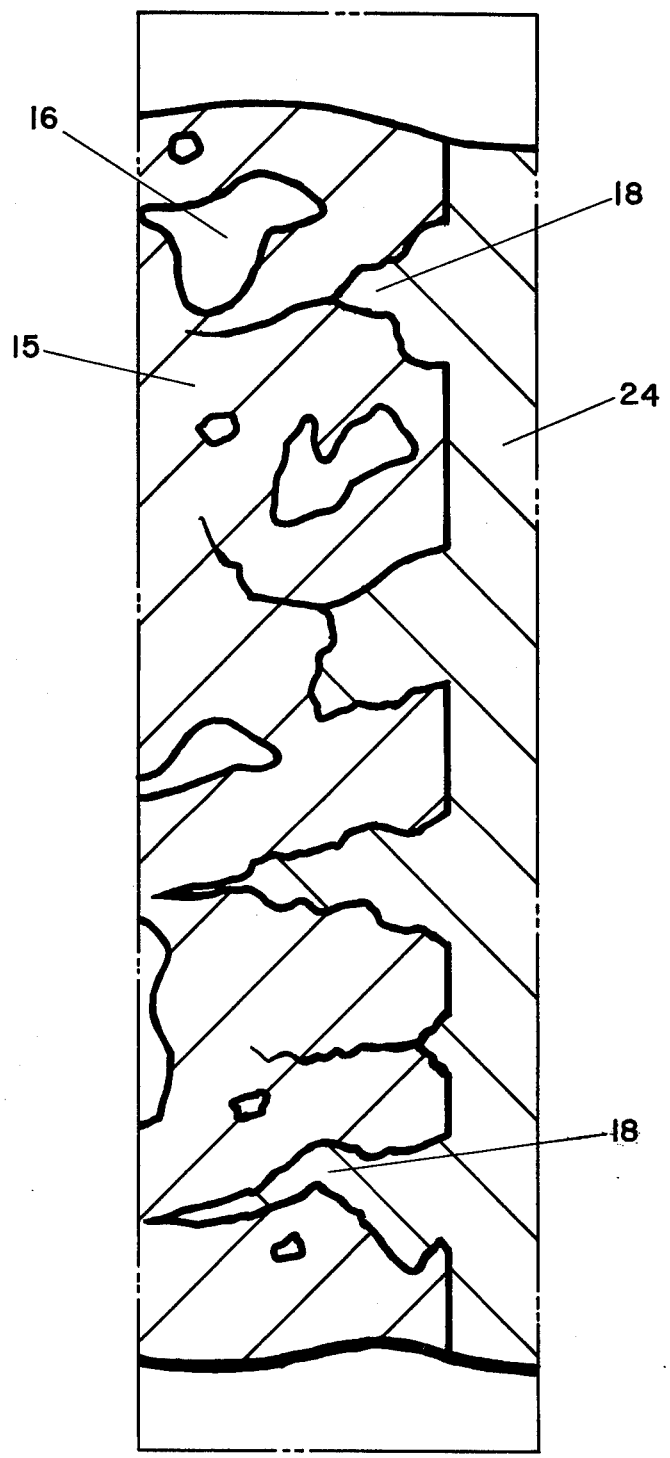
FIG. 7 is a yet further expanded view of that portion of the sectional view illustrated in FIG. 6 which is surrounded by rectangle 7 of FIG. 6.

FIG. 7, which is an expansion of that portion of FIG. 6 contained within rectangle 7 of FIG. 6 illustrates the mechanical bonding action between resin binder 24 of the outer reinforced layer, which has impregnated space 18 caused by the mechanically induced cracks of the abrasion resistant pipe lining layer.

Figure 8:
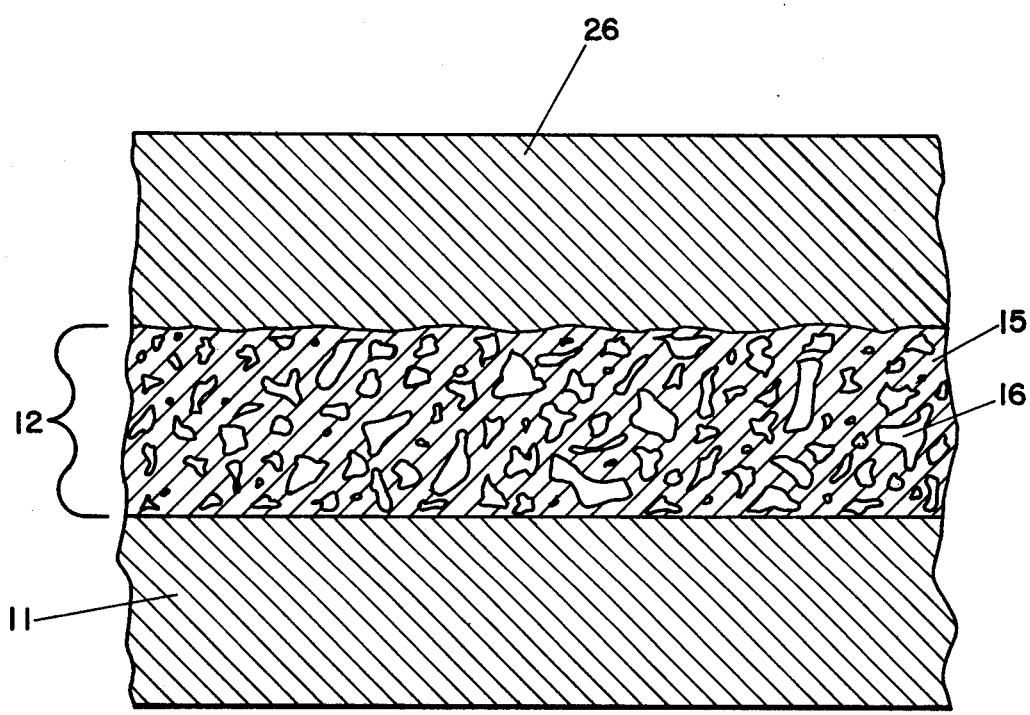
FIG. 8 is a sectional view of another preferred embodiment of the abrasion resistant pipe lining material of the present invention, comprising a backing sheet layer, an abrasion resistant pipe lining layer of abrasion resistant granules in a flexible binder, and an adhesive layer.

FIG. 8 illustrates another embodiment of the present invention, not intended for use in building a pipe, but for use in lending additional abrasion resistance to a pre-existing pipe. In this embodiment, the abrasion resistant pipe lining sheet comprising backing layer 11 and abrasion resistant pipe lining layer 12, which in turn comprises flexible binder 15 and abrasion resistant granules 16, consists essentially of in addition as a separate layer, a coating 26 of adhesive on the relatively uneven surface of the side of layer 12 oppposite backing layer 11.

Adhesive layer 26 can be, for example, a pressure sensitive adhesive, such as is known in the art. These adhesives generally consist of a film forming elastomeric material, often one of the several types of natural or synthetic rubber, and some type of resin or other material to impart the desired degree of tack, wetting power and specific adhesion. Resins for such tack and wetting power include various resin derivatives, such as dehydrogenated rosin, hydrogenated rosin, or their esters. Terpene resins are other synthetic resins are also used as tackifiers.

Also useful for adhesive coating 26 are adhesives which are heat sensitive, for sensitive to both heat and pressure. Examples of such resins are thermosetting resin adhesives, such as the urea, phenol, resorcinol, furan, epoxy, and melamine resins. In these adhesives, a monomer or low molecular weight polymer is mixed with a catalyst or in some cases additional reactants, and spread in liquid form over abrasion resistant layer 12. The abrasion resistant pipe lining sheet is then placed within the adhesively bonded to the inner surface of a pipe, with adhesive layer 26 adjacent to the inner surface of the pre-existing pipe.

Preferably the abrasion resistant pipe lining sheet is successively helically wound within the pipe, although successive stripes, parallel to the axis of the pipe, can also be used. Other configurations are possible as well. The adhesive 26 is then activated, for example by exerting pressure on backing 11 or abrasion resistant layer 12 of the pipe lining material, for example by means of a small mandrel which rotates against the abrasion resistant pipe lining. Another method which may be used to exert pressure against the abrasion resistant pipe lining sheet is a stream filled bladder, which also can exert the temperature needed to activate a temperature sensitive adhesive. Since such adhesives frequently have limited shelf lives and liquid pot lives, adhesive 26 is preferably prepared and applied to abrasion resistant layer 12 shortly before the pipe lining is to be applied to the interior of a pre-existing pipe.

The invention will now be illustrated with several examples.

EXAMPLE 1

A cotton cloth backing, having a 2 × 1 twill weave and a 76 × 48 thread count was pretreated with a coating comprising compounded nitrile (polybutadiene-acrylonitrile) rubber dispersion and a phenolic resin. The nitrile coating was a high acrylonitrile composition of B. F. Goodrich Chemical Co. identified as "Hycar 1571", and contained small amounts of zinc oxide, sulfur, accelarator and phenolic resin, the latter to produce a better bond with the phenolic resin coating. After the nitrile coating was applied (at a rate of 90 gms/m$^2$) by dipping, the nitrile coating was partially cured and a phenolic resin coating (an amine-catalyzed phenol-formaldehyde resole) was applied by dipping and partially cured. Up to this point, the backing is a highly conventional backing as used in the coating abrasive art.

The nitrile and phenolic resin treated cloth was coated with a first coating of uncured polyurethane resin binder, at a rate of 180 gms/m$^2$. The polyurethane resin binder was prepared by mixing together an —NCO terminated polytetramethylene ether glycol and a blend of a diol and a triol. The polyurethane coated cloth was then passed under a container of alumina grain, with the polyurethane resin binder coating on the top of the cloth. The alumina grain was then sprinkled on the polyurethane resin coated backing at a rate of 1100 gms/m$^2$. The abrasion resistant alumina granules were group graded as grit size 54, which has the following size distribution:

210 – 395 microns — 90%
60 – 135 microns — 10%

This was a blocky grain, having approximately equal dimensions in all directions, as contrasted with the usual type of elongated granules which are preferred for coated abrasive articles, in order to achieve a planing effect. This grain is marketed by The Carborundum Company of Niagara Falls, New York, as Blastite alumina abrasive grain.

After the cloth had been coated with the alumina abrasive, it contained about 75 pounds per ream, or about 1100 gms/m$^2$, of alumina granules. A ream is 480 sheets, each 22.9 × 27.9 cm, so that the total surface area of a ream is about 30.66 l m$^2$.

The coated backing, containing alumina granules embedded in an uncured polyurethane resin binder, was then passed under a steel roller with the alumina granules toward the roller, whereby a compaction of the alumina granules was obtained, so that the alumina granules, when later coated with a second coating of polyurethane resin binder, would constitute about 50% by volume of the abrasion resistant pipe lining material. A pressure of roughly 300 gms/cm$^2$ on the grain was generated. The backing coating with polyurethane resin and having the rolled alumina granules thereon, was then dried at 80° C for about an hour and then coated with a second coat of the same type of polyurethane resin binder, applied at a rate of 370 gms/m$^2$. The material was again dried at 80° C for about an hour. Both polyurethane resin binder coats were then cured at a temperature of about 120° C.

The abrasion resistant pipe lining sheet is now complete. Its density is much greater than that of a conventional coated abrasive article, if gross dimensions are considered, because of the compaction, orientation and diverse size of the alumina granules. The pipe lining sheet can be used for building an abrasion resistant pipe, starting with a central layer consisting of the abrasion resistant pipe lining sheet of this example, positioned with the nitrile rubber treated cloth backing adjacent the mandrel on which the pipe is built. It is found when the pipe is constructed, that the nitrile rubber treated cloth provides a degree of abrasion resistance, so that the interior of the pipe remains smooth and nonobstructing for a time after its use is begun. After some degree of use for transmitting abrasive particles contained in a water slurry, the nitrile rubber treated cloth backing is worn away; and the interior of the pipe becomes slightly rough and irregular, causing a slight amount of drag on the abrasive slurry being pumped through the pipe. The abrasion resistant pipe lining layer, consisting of alumina granules bonded in the cured polyurethane resin binder, remains for a substantial length of time, providing abrasion resistance to the interior of the pipe.

EXAMPLE 2

Example 1 was repeated, except that the nitrile rubber treated cloth was substituted with a hide glue starch treated cotton cloth backing, and the polyurethane resin binder of Example 1 was substititued with a phenolic resin binder.

After curing the first and second coats of phenolic resin binder, the abrasion resistant pipe lining sheet had become somewhat inflexible. Accordingly, the abrasion resistant pipe lining sheet was rendered again flexible by inducing mechanical cracks in the phenolic resin binder, by passing the pipe lining sheet over a pair of 45° flexing bars, so that the pipe lining sheet was flexed in directions which would produce mecanical cracks in the phenolic resin binder.

The phenolic resin utilized in this example was a resole type phenolic resin, made from formaldehyde and phenol in a ratio of about 1.6:1, and catalyzed with barium hydroxide. The first coating of phenolic resin as utilized in Example 2 contained about 50% of the uncured phenolic resin, and about 50% of a finely divided calcium carbonate filler, having a particle size of about 15 microns. The second phenolic resin coating as utilized in Example 2, contained about 45% of the uncured phenolic resin, and about 55% by weight of the same calcium carbonate filler. After curing substantial water had been evaporated, and the overall composition of the cured phenolic resin was about 35% cured condensation product of formaldehyde and phenol, and about 65% calcium carbonate, by dry weight.

EXAMPLES 3–4

Examples 1 and 2 were duplicated, except that the alumina grain was replaced with an alumina/zirconia grain containing about 80% alumina, 28% zirconia, and minor amounts of titania, silica, iron oxide ($Fe_2O_3$), magnesia, sodium oxide and carbon. This grain had the following particle size distribution:
- 203 – 495 microns — 42%
- 165 – 406 microns — 47%
- 50 – 102 microns — 11%

Pipes made with these pipe lining sheets are found to be somewhat more abrasion resistant than those of Examples 1 and 2.

EXAMPLE 5

A hide glue-starch treated 2 × 1 twill weave cotton cloth, 76 × 48 thread count, was coated with the phenolic resin described in Example 2, then with silicon carbide of the following particle size distribution, by weight:
- 250 – 325 microns — 20%   325 – 340 microns — 20%
- 340 – 360 microns — 20%
- 360 – 390 microns — 20%
- 390 – 430 microns — 20%

As in Example 2, the first phenolic resin coating contained 50% finely divided $CaCO_3$ and 50% uncured phenolic resin; the second coat contained 55% by weight $CaCO_3$ and 45% uncured phenolic resin, and the overall composition of the cured resin was about 35% condensation product of formaldehyde and phenol, 65% calcium carbonate. The first resin coat, silicon carbide coat, and second resin coat were applied at the respective rates of 240, 488 and 250 gms/m². This resulted in the coating containing about 50% by volume silicon carbide.

The resin was next partially cured, by advancing the phenolic resin to the "B-stage" of polymerization. The partially cured pipe lining material was then helically wound about a 2-inch diameter cylindrical mandrel, backing side inwards, as illustrated in FIG. 4. Glass fibers saturated with an anhydride catalyzed epoxy resin were wrapped about the mandrel and helically wound pipe lining, and the curing of the resin binder of the pipe lining was completed simultaneously with the curing of the resin binder of the pipe. The pipe is found to be sturdily and integrally bonded into an abrasion resistant pipe.

We claim:

1. An abrasion resistant, coated and abrasion containing, pipe lining sheet having a thickness of not less than about 0.75 mm, a backing side with a relatively uneven surface, and being sufficiently flexible to be wound backing side inward around a mandrel in building a pipe or within a pre-existing pipe, said sheet including a backing, and a composite layer on said backing and consisting essentially if: (1) from about 30 to about 70% by volume of abrasive granules selected from the group consisting of the refractory metal borides, carbides, nitrides, oxides, and mixtures thereof, and (2) from about 70 to about 30% by volume of an at least partially cured organic resin binder, said composite layer being formed by a first binder coat on said backing and forming said smooth surface, a coating of said abrasive granules deposited on said first binder coat in a non-aligned orientation and compacted in said first binder coat under pressure, and a second binder coat covering said granules, merging with said first binder coat and forming said uneven surface, said granules having a minimum particle size of about 50 microns with most of said granules being somewhat larger, a maximum dimension of not more than about twice their minimum dimension and somewhat smaller than the thickness of said sheet, and such diverse size that all of the largest 50% by weight of said granules have at least 30% greater maximum dimension than all of the smallest 10% by weight thereof.

2. The sheet of claim 1, wherein said backing is made of paper, textile or combinations thereof and is bonded to said smooth surface of said composite layer.

3. The sheet of claim 1, wherein said backing is made of non-absorbent, non-reactive film and is removable from said smooth surface of said composite layer.

4. The sheet of claim 1, including an adhesive layer on said uneven surface of said composite layer.

5. The sheet of claim 4, wherein said backing is made of paper, textiles or combinations thereof and is bonded to said smooth surface of said composite layer.

6. The sheet of claim 4 wherein said backing is made of non-absorbent, non-reactive film, and is removable from said smooth surface of said composite layer.

7. The sheet of claim 1 having a thickness of not more than about 3 cm, and wherein said composite layer consists essentially of: (1) from about 45 to about 55% by volume of said abrasive granules selected from the group consisting of silicon carbide, alumina, fused combinations of alumina and zirconia, and mixtures thereof, and (2) from about 55 to about 45% by volume of said organic resin binder selected from the group consisting of phenolic, polyurethane, polybutadiene-acrylonitrile, and epoxy resins, and said granules have a maximum dimension no more than about ½ the thickness of said sheet, and such diverse size that all of the largest 85% by weight of said granules have at least 50% greater maximum dimension than all of the smallest 10% by weight thereof.

8. The sheet of claim 7 wherein said backing is made of paper, textile or combinations thereof, and is bonded to said smooth surface of said composite layer.

9. The sheet of claim 7 wherein said backing is made of non-absorbent, non-reactive polyester film and is removable from said smooth surface of said composite layer.

10. The sheet of claim 7 including an adhesive layer on said uneven surface of said composite layer.

11. The sheet of claim 10 wherein said backing is made of paper, textiles, or combinations thereof and is bonded to said smooth surface of said composite layer.

12. The sheet of claim 10 wherein said backing is made of non-absorbent, non-reactive film and is removable from said smooth surface of said composite layer.

* * * * *